United States Patent
Koeneman et al.

(10) Patent No.: US 7,290,555 B2
(45) Date of Patent: *Nov. 6, 2007

(54) EMBEDDED MICROFLUIDIC CHECK-VALVE

(75) Inventors: Paul B. Koeneman, Palm Bay, FL (US); Terry M. Provo, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 334 days.

This patent is subject to a terminal disclaimer.

(21) Appl. No.: 10/872,204

(22) Filed: Jun. 18, 2004

(65) Prior Publication Data

US 2005/0279412 A1   Dec. 22, 2005

(51) Int. Cl.
*F16K 15/04* (2006.01)

(52) U.S. Cl. .............................. 137/15.18; 137/315.33; 137/533.11; 251/368

(58) Field of Classification Search ............. 137/15.18, 137/315.33, 533.11, 533.19, 829, 833; 251/368; 156/89.11; 417/413.3
See application file for complete search history.

(56) References Cited

U.S. PATENT DOCUMENTS

| | | | | |
|---|---|---|---|---|
| 3,882,895 | A | * | 5/1975 | Glattli et al. ................ 137/594 |
| 4,286,622 | A | * | 9/1981 | Ninomiya et al. ...... 137/533.11 |
| 4,911,616 | A | * | 3/1990 | Laumann, Jr. ........... 417/413.3 |
| 6,554,591 | B1 | | 4/2003 | Dai et al. |
| 6,572,830 | B1 | * | 6/2003 | Burdon et al. ........... 156/89.11 |
| 6,620,273 | B2 | | 9/2003 | Dai et al. |
| 6,921,253 | B2 | * | 7/2005 | Shuler et al. ............ 417/413.3 |
| 7,032,608 | B2 | * | 4/2006 | Koeneman et al. ...... 137/15.18 |
| 2005/0281696 | A1 | * | 12/2005 | Koeneman et al. ......... 417/566 |

* cited by examiner

*Primary Examiner*—John Rivell
(74) *Attorney, Agent, or Firm*—Darby & Darby; Robert J. Sacco

(57) ABSTRACT

Embedded check-valve manufacturing assembly (100, 600) for integration in a micro-fluidic system. The assembly can include a check-valve chamber (104, 604), an inlet port (106, 606) and an outlet port (108, 608) formed from at least one layer of an low-temperature co-fired ceramic (LTCC) tape to form a substrate (102, 602). A fired LTCC plug (114, 614) is disposed within the check-valve chamber.

21 Claims, 6 Drawing Sheets

EMBEDDED MICROFLUIDIC CHECK-VALVE

BACKGROUND OF THE INVENTION

1. Statement of the Technical Field

The inventive arrangements relate generally to microfluidic devices and more particularly to structures and systems for preventing fluid backflow.

2. Description of the Related Art

Micro-fluidic systems have the potential to play an increasingly important role in many developing technology areas. For example, there has been an increasing interest in recent years in the use of fluid dielectrics for use in RF systems. Likewise, conductive fluids can have use in RF systems as well.

Another technological field where micro-fluidic systems are likely to play an increasingly important role is fuel cells. Fuel cells generate electricity and heat by electrochemically combining a gaseous fuel and an oxidant gas, via an ion-conducting electrolyte. The process produces waste water as a byproduct of the reaction. This waste water must be transported away from the reaction to be exhausted from the system by a fluid management sub-system.

Efforts are currently under way to create very small fuel cells, called microcells. It is anticipated that such microcells may eventually be adapted for use in many portable electronics applications. For example, such devices could be used for powering laptop computers and cell phones. Still, microcells present a number of design challenges that will need to be overcome before these devices can be practically implemented. For example, miniaturized electromechanical systems must be developed for controlling the fuel cell reaction, delivering fuel to the reactive components and disposing of water produced in the reaction. In this regard, innovations in fuel cell designs are beginning to look to silicon processing and other techniques from the fields of microelectronics and micro-systems engineering.

Glass ceramic substrates sintered at 500° C. to 1,100° C. are commonly referred to as low-temperature co-fired ceramics (LTCC). This class of materials has a number of advantages that makes it especially useful as substrates for RF systems. For example, low temperature 951 co-fire Green Tape™ from Dupont® is Au and Ag compatible, and it has a thermal coefficient of expansion (TCE) and relative strength that are suitable for many applications. The material is available in thicknesses ranging from 114 μm to 254 μm and is designed for use as an insulating layer in hybrid circuits, multi-chip modules, single chip packages, and ceramic printed wire boards, including RF circuit boards. Similar products are available from other manufacturers.

LTCC substrate systems commonly combine many thin layers of ceramic and conductors. The individual layers are typically formed from a ceramic/glass frit that can be held together with a binder and formed into a sheet. The sheet is usually delivered in a roll in an unfired or "green" state. Hence, the common reference to such material as "green tape". Conductors can be screened onto the layers of tape to form RF circuit elements antenna elements and transmission lines. Two or more layers of the same type of tape are then fired in an oven.

Many of the same characteristics that make LTCC an excellent choice for fabrication of microelectronic circuits also suggest its value for use in microfluidic applications. LTCC is mechanically stable at temperatures from below freezing to over 250° C., has known resistance to chemical attack from a wide range of fluids, produces no warpage during compression, and has superior properties of absorption as compared to other types of material. These factors, plus LTCC's proven suitability for manufacturing miniaturized RF circuits, make it a natural choice for manufacturing microfluidic systems including, but not limited to, fluid systems used in microcells.

Many of the applications for fuel cells and other types of fluid systems can require fluid control systems, and more particularly an ability to prevent backflow of fluids. Accordingly, check-valves that allow fluid to flow in only one direction are often needed in such systems. Conventional approaches to such check-valves can be implemented in micro-fluidic LTCC devices as discrete components added to the LTCC after firing. However, discrete components are typically mounted on the surface of the device and can create a higher profile. They also can tend to be less robust.

In the semiconductor area, there has been some development of micro electromechanical systems (MEMS) that include check-valves. However, these devices tend to have long development times, are difficult to interface in the macro world, and require more mechanical interfaces. In contrast, LTCC systems can involve a considerably shorter development time and are showing promise in the fuel cell area. Accordingly, integrated LTCC fluid flow components are important for the future of micro-fluidic systems for fuel cells and other technologies.

SUMMARY OF THE INVENTION

The invention concerns a method for embedding a check-valve in an LTCC based micro-fluidic system. The method can include the steps of forming from one or more layer of unfired low-temperature co-fired ceramic (LTCC) tape, a check-valve chamber, an inlet port in fluid communication with the check-valve chamber, and at least one outlet port in fluid communication with the check-valve chamber. Subsequently the one or more layers of LTCC tape can be fired. After the firing process is complete, a plug can be positioned within the check-valve chamber. The plug can be formed from at least one of a metal, a polymer, and an LTCC material. The plug can have a size and shape selected for sealing the inlet port when the plug is lodged in a valve seat of the inlet port. For example, the plug can be selected to have a spherical shape. Finally, the check-valve chamber can be sealed with a cap after the plug is positioned within the check-valve chamber.

According to one aspect, the method can include the step of selecting a shape of the check-valve chamber and a position of the inlet port for automatically sealing the inlet port with the plug in the presence of a fluid backflow from the check-valve chamber toward the inlet port. The shape of the check-valve chamber can also be selected for automatically unsealing the plug from the inlet port in the presence of a fluid flow from the inlet port toward the check-valve chamber. For example the check-valve chamber can be formed with a tapered profile. The tapered profile can be selected so as to taper inwardly in a direction toward the inlet port.

Several variations are possible with respect to the exact arrangement of the check-valve. For example, the method can include the step of forming the check-valve chamber with two or more outlet ports to ensure that one will remain open if the other port is blocked. According to another aspect, the method can include the step of forming the inlet port and the outlet port on mutually orthogonal surfaces of the check-valve chamber. The method can also include the step of forming a valve seat for the inlet port. The valve seat can define a sealing surface corresponding to at least a portion of the plug.

The check-valve chamber can be formed exclusive of any structure that will restrict the movement of the plug within the check-valve chamber. Alternatively, the method can include the step of constraining a range of movement of the plug to prevent sealing of at least one of the outlet ports. The constraining step can include forming a guide structure in at least one of the LTCC tape and the cap for guiding the plug within the check-valve chamber.

According to another embodiment, the invention can include an embedded fluid check-valve integrated within an LTCC substrate. The check-valve can include a check-valve chamber formed from at least one layer of an unfired low-temperature co-fired ceramic (LTCC) tape. The check-valve chamber can have an inlet port in fluid communication with the check-valve chamber, and an outlet port in fluid communication with the check-valve chamber. According to one aspect of the invention, the inlet port and the outlet port can be disposed on mutually orthogonal surfaces of the check-valve chamber.

A plug can be positioned within the check-valve chamber, and at least a portion of the plug can have a shape corresponding to a contour of a valve seat formed at an interface between the inlet port and the check-valve chamber. For example, the plug can have a spherical shape. The plug can be formed from any suitable material including, for example, a shape selected from the group consisting of a polymer, a metal and an LTCC. Finally, a cap can enclose at least a portion of the check-valve chamber.

According to another aspect of the invention, the check-valve chamber can have a tapered profile. For example, the tapered profile can be tapered inwardly in a direction toward the valve seat. The check-valve chamber can also include a plurality of the outlet ports. The check-valve chamber can provide an unrestricted range of movement for the plug within the check-valve chamber. Alternatively, the check-valve chamber can include at least one guide surface constraining the movement of the plug within the check-valve chamber.

DETAILED DESCRIPTION OF THE PREFERRED EMBODIMENTS

Figure 1A:
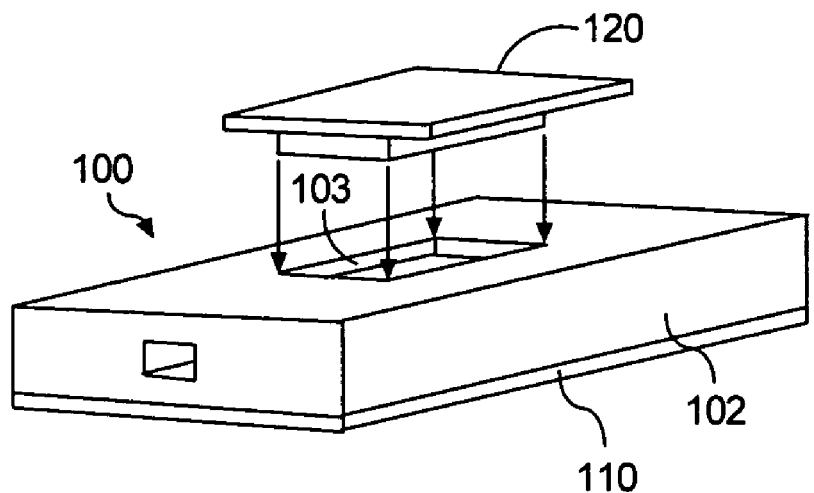
FIGS. 1A and 1B are perspective views of a micro-fluidic check-valve that is useful for understanding the present invention.
Figure 1B:
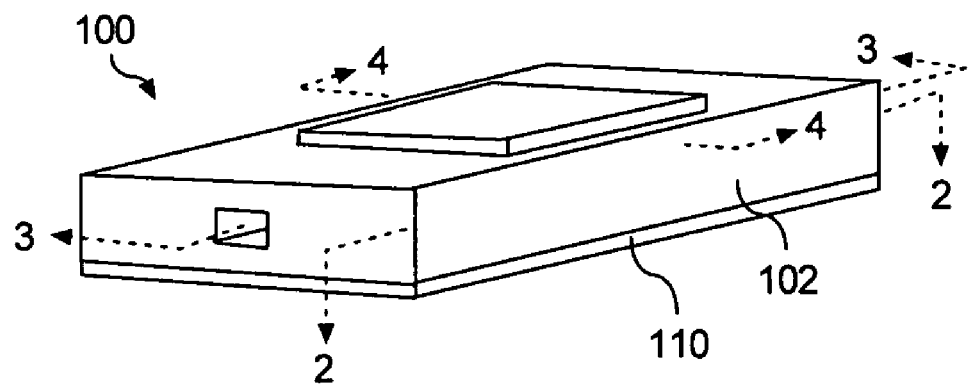

FIGS. 1A and 1B show a first embodiment of a check-valve assembly 100 that is implemented in a substrate 102. The check-valve assembly 100 can be a stand alone device or can be advantageously integrated with a larger system on the substrate. Examples of such larger systems can include fuel cells, micro-motors, and other MEMS type devices. Other examples can include fluid dielectric based devices in the RF field such as antenna elements, matching sections, delay lines, beam steering elements, tunable transmission lines, stubs and filters, variable attenuators, and cavity structures. Still, the invention is not limited to any particular type of device.

The substrate 102 can be formed of a ceramic material. Any of a wide variety of ceramics can be used for this purpose. However, according to a preferred embodiment, the substrate can be formed of a glass ceramic material fired at 500° C. to 1,100° C. Such materials are commonly referred to as low-temperature co-fired ceramics (LTCC).

Commercially available LTCC materials are commonly offered in thin sheets or tapes that can be stacked in multiple layers to create completed substrates. For example, low temperature 951 co-fire Green Tape™ from Dupont® may be used for this purpose. The 951 co-fire Green Tape™ is Au and Ag compatible, has acceptable mechanical properties with regard to thermal coefficient of expansion (TCE), and relative strength. It is available in thicknesses ranging from 114 µm to 254 µm. Other similar types of systems include a material known as CT2000 from W. C. Heraeus GmbH, and A6S type LTCC from Ferro Electronic Materials of Vista, Calif. Any of these materials, as well as a variety of other LTCC materials with varying electrical properties can be used.

In some instances it can also be desirable to include a conductive ground plane 110 on at least one side of the substrate 102. For example, the ground plane 110 can be used in those instances where RF circuitry is formed on the surface of the substrate 102. The conductive ground plane 110 can also be used for shielding components from exposure to RF and for a wide variety of other purposes. The conductive metal ground plane can be formed of a conductive metal that is compatible with the substrate 102. Still, those skilled in the art will appreciate that the ground plane is not required for the purposes of the invention.

Figure 2:
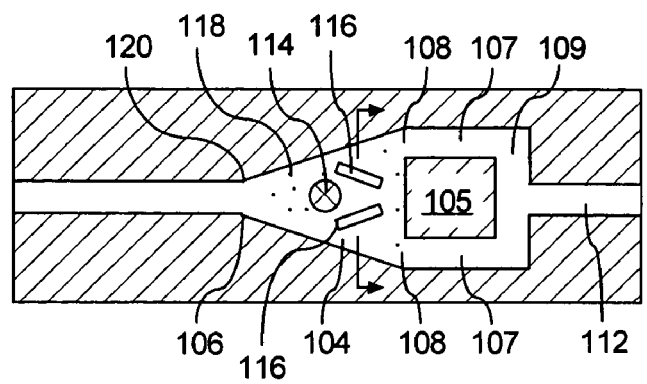
FIG. 2 is a cross-sectional view of the check-valve in FIG. 1, taken along line 2-2.
Figure 3:
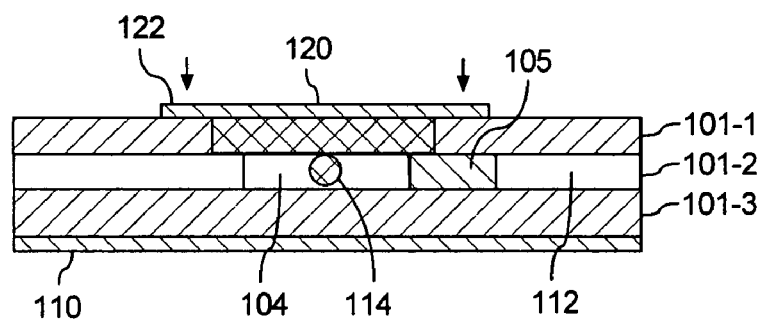
FIG. 3 is a cross-sectional view of the check-valve in FIG. 1, taken along line 3-3.
Figure 4:
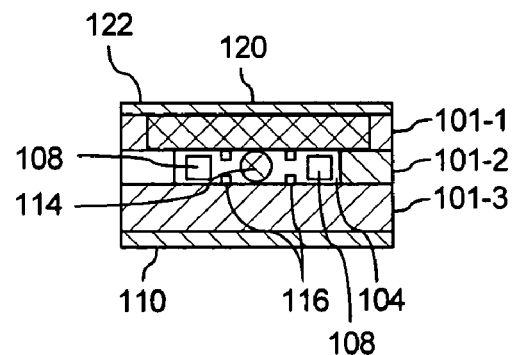
FIG. 4 is a cross-sectional view of the check-valve in FIG. 1, taken along line 4-4.

The check-valve assembly 100 is shown in cross-sectional view in FIGS. 2 and 3. As illustrated therein, a check-valve chamber 104 is formed from a plurality of layers 101-1, 101-2, 101-3 of unfired LTCC tape. In FIG. 3, only three layers of LTCC tape are shown. However, it should be understood that the invention is not limited in this regard and any number of LTCC tape layers can be used. An access port 103 can be defined in an outer LTCC layers so as to permit convenient access to the check-valve chamber 104 for reasons which shall be hereinafter described in greater detail. A cap 120 can be used to close the access port.

The check-valve chamber can have an inlet port 106 in fluid communication with the check-valve chamber 104 as shown. At least one outlet port 108 is also provided in fluid communication with the check-valve chamber 104. If more than one outlet port 108 is provided, a manifold 109 can provide multiple fluid paths 107 that advantageously allow both outlet ports 108 to feed a common output conduit 112. Consequently, if one outlet port 108 is blocked for any reason, fluid can continue flowing toward the outlet conduit 112 through the other outlet port.

The various internal structures, conduits and chambers shown in FIG. 2 can be formed by any suitable means. For example, after the layers 101-2 and 101-3 have been stacked, the internal structures such as island 105 and guide structures 116 can in one embodiment be hand placed within the check-valve chamber prior to adding the top layer 101-1 and/or cap 120. In another embodiment, the layers 101-2 and 101-3 could be laminated as shown, and could then be machined using a router so as to form the check-valve.

Figure 5A:
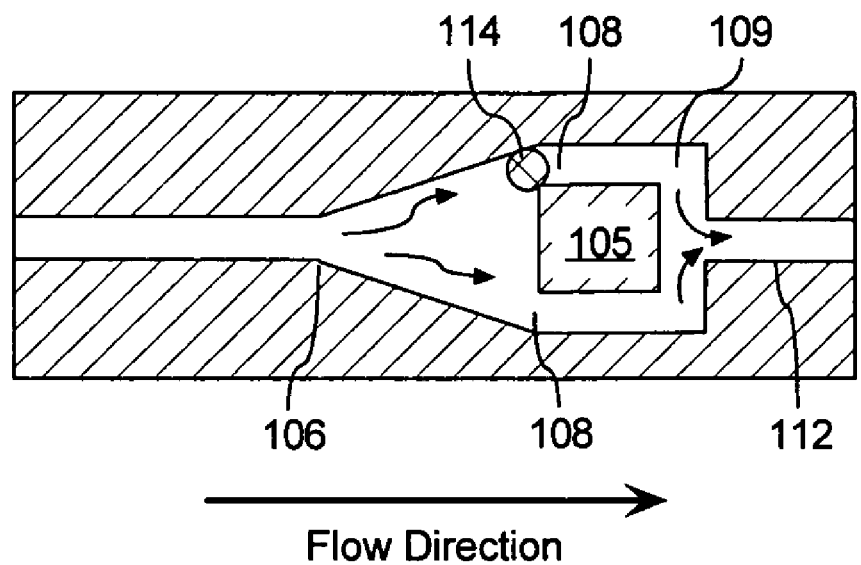
FIG. 5A is a cross-sectional view of the check-valve in FIG. 1, taken along line 2-2, in the presence of a fluid flow in a first direction.

Referring again to FIG. 2, the inlet port 106 can also include a valve seat 120. The valve seat can define a contour or surface corresponding to at least a portion of the shape of the plug 114 for forming a good seal with the plug. A guide structure 116 can optionally be provided within the check-valve chamber to constrain the motion of the plug 114. The guide structure 116 can perform several functions. For example, in those instances where a non-spherical shaped plug is used, the guide structure 116 can maintain the plug 114 in a desired orientation for forming a seal with the inlet port 106. The guide structure can also be used to limit a range of motion for the plug 114 so as to ensure that the plug cannot seal any of the outlet ports 108 when fluid is flowing in a forward direction, i.e. from the inlet port 106 toward to outlet port 108. If the guide structure 116 is used, the need for more than one outlet port 108 can be avoided. However, without the guide structure, a plurality of outlet ports can be desirable to maintain a fluid flow path when one outlet port is blocked. Without the guide structure 116, one outlet port 108 can become blocked as shown in FIG. 5A when fluid is flowing in the forward direction.

Once the unfired LTCC layers 101-1, 101-2, and 101-3 have been arranged to form the check-valve chamber as shown in FIGS. 1-3, they can be fired in accordance with conventional LTCC processing techniques. Thereafter, a plug 114 can be positioned within the check-valve chamber 104. The plug 114 is preferably formed so that it is at least somewhat larger than the size of the opening defining the inlet port 106 defined by the fired LTCC layers. The plug 114 can advantageously be formed so as to have any shape that will allow the plug to form a close fitting seal when it is urged against the inlet port 106. For example, a spherical shape can be used for this purpose. The spherical shape will allow the plug, when it is urged toward the inlet port 106, to block the inlet port 106 regardless of the orientation of the plug. A spherically shaped plug 114 can be advantageous as it will form a proper seal regardless of plug orientation. Still, the plug can have other shapes and still form a suitable seal.

The plug 114 can be formed of any suitable material that is compatible with the LTCC layers 101-1, 101-2, 101-3, and any fluid that is intended to be used in the device. For example, the plug 114 can be formed of a metal, glass or polymer. In some instances, it may be desirable to form the plug from LTCC. In that case, the plug can be fired and formed to the necessary shape before it is placed within the check-valve chamber 104. Firing an LTCC plug prior to positioning it in the check valve chamber is advantageous in order to help prevent the plug from adhering to the LTCC tape layers. More particularly, if the unfired tape layers 101-1, 101-2, and 101-3 are co-fired together with an unfired LTCC plug 114 pre-disposed in the check-valve chamber, then there is a significant possibility that the plug 114 will adhere to the walls of the check-valve chamber. Firing the plug 114 and LTCC layers separately before the plug is disposed in the check-valve chamber can avoid this problem.

The plug 114 can be formed in the required shape while the LTCC from which it is formed is still in the unfired state. The plug can then be fired prior to being positioned within the check-valve chamber. Alternatively, the plug can be fired and then machined to the proper shape before being placed within the check valve chamber.

After the layers of LTCC tape 101-1, 101-2, 101-3 forming the check-valve chamber have been fired, the completed plug 114 can be placed in the check-valve chamber as show in FIGS. 2 and 3. Insertion of the plug within the check-valve chamber is made possible by the availability of an opening in the chamber formed by the access port 103.

In order to complete the check-valve chamber, the cap 120 can be fitted into the access port 103 as illustrated in FIGS. 1A, 1B, 3 and 4. The cap can include a flange 122 that extends somewhat beyond the edge of the opening defined by the access port 103. The flange 122 can help provide a better seal in some instances and can provide a surface on which an adhesive can be disposed for securing the cap to the outer surface of the LTCC layers. However, the invention is not limited in this regard and the cap 120 does not need to include such a flange.

The cap 120 can be formed of any suitable material that is compatible with the LTCC layers forming the check-valve assembly. For example, the cap 120 can be formed of metal, polymer, ceramic, or any combination thereof, provided that the material has suitable mechanical properties and is capable of effectively forming a fluid seal for the access port. According to one embodiment, the cap 120 can be at least partially formed of an LTCC material so that the thermal coefficient of expansion and other mechanical properties of the cap will closely match the material defining the access port 103. Still, the invention is not limited to any particular material and other materials can also be used to form the cap.

The cap 120 can be secured in the access port 103 by any suitable means. For example, an epoxy adhesive can be disposed around a periphery of the cap 120 to secure it to the LTCC layers and ensure a fluid seal. Alternatively, any other adhesive can be used provided that it is compatible with LTCC and will not be otherwise adversely affected by any fluid that may eventually be used in the check-valve. Adhesive can be disposed in those areas where the cap 120 has surfaces in contact with the access port 103 and around a periphery of the access port 102. Alternatively, the cap can be sintered, threaded into the access port or secured by a pressure fit. Still, the invention is not limited in this regard and any other suitable securing method can also be used. For example, soldering and brazing are other optional methods by which the cap can be attached. These methods could be used to form a hermetic seal which might be needed in some applications.

Referring once again to FIG. 2, the check-valve chamber 104 can have a tapered profile so that it tapers inwardly in a direction of the inlet port 108. The tapered profile is useful for ensuring that the plug 114 will be directed toward the inlet port 106 in the event of a fluid backflow proceeding from the outlet ports 108 toward the inlet port 106. Still, those skilled in the art will appreciate that the check-valve chamber can have other shapes as well.

Figure 5B:
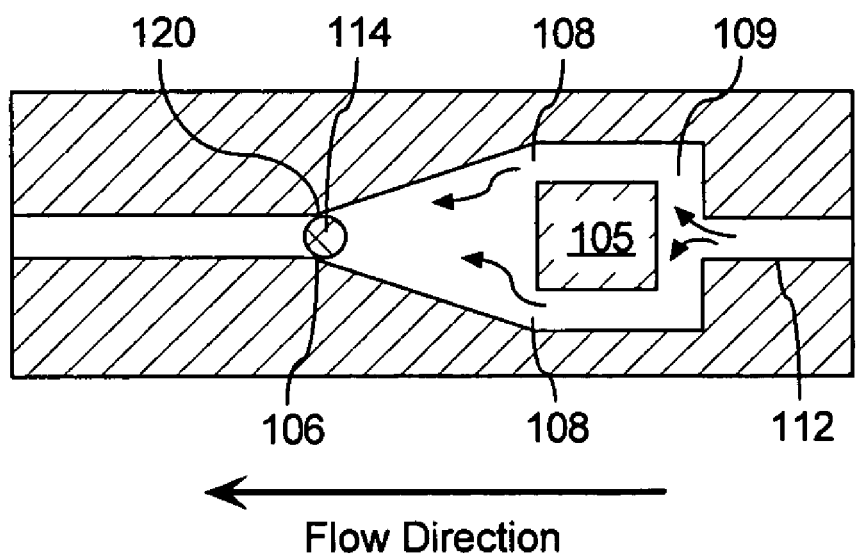
FIG. 5B is a cross-sectional view of the check-valve in FIG. 1, taken along line 2-2, in the presence of a fluid flow in a second back-flow direction.

Referring now to FIGS. 5A and 5B, it may be observed that fluid flow in a forward direction can cause the plug 114 to disengage from the valve seat 120. If a guide structure 116 is provided, the plug can be urged into a guide structure by the fluid flow so as to remain clear of the outlet ports 108.

Alternatively, if no guide structure 116 is provided, the plug 114 can move about freely in the chamber and may lodge in one of the outlet ports. Still, fluid will be able to flow freely in the forward direction if two outlet ports 108 are provided and the manifold 109 will direct a flow from either outlet port 108 to the outlet conduit 112.

The check-valve can prevent a fluid backflow as shown in FIG. 5B. In the event that conditions in a fluid system in which the check-valve is installed cause a fluid flow in the direction shown in FIG. 5B, the plug 114 will be urged toward the inlet port and will ultimately become lodged in the valve seat 120. Thereafter, backflow of fluid will be prevented and the plug 114 will not become unseated until a fluid flow in the direction shown in FIG. 5A is resumed.

Figure 6A:
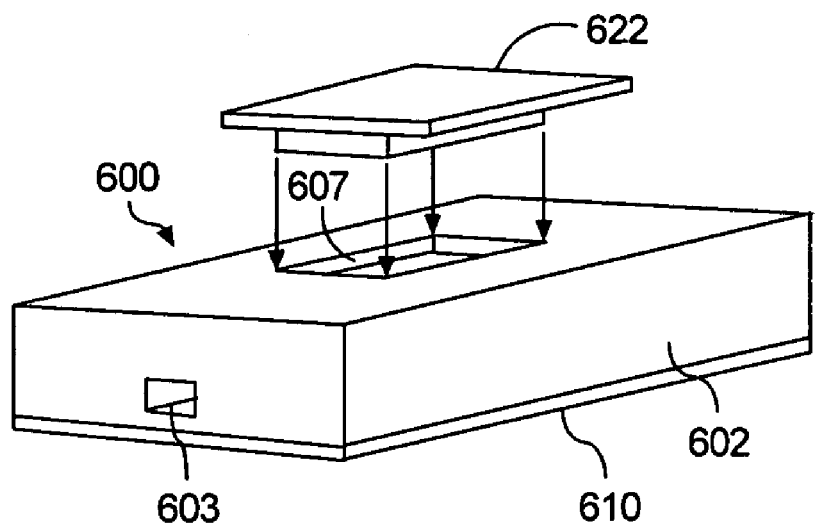
FIGS. 6A and 6B are perspective views of an alternative embodiment micro-fluidic check-valve that is useful for understanding the present invention.
Figure 6B:
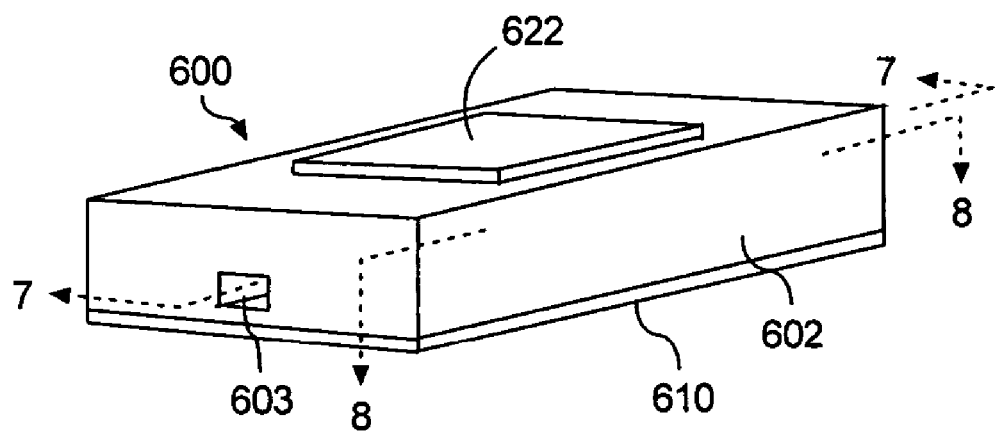
Figure 7A:
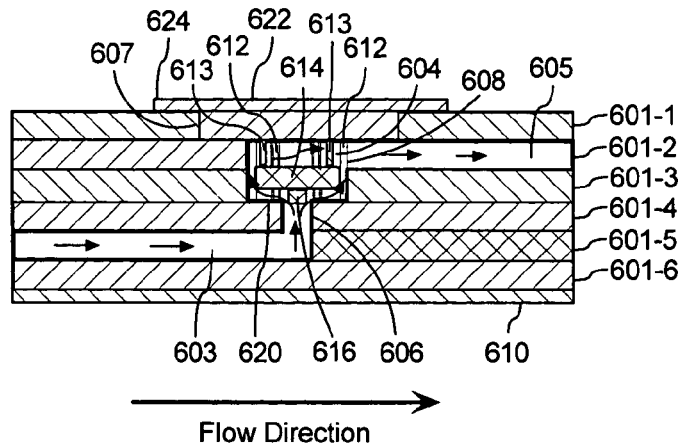
FIGS. 7A-7B are a set of drawings that are useful for understanding the operation of the micro-fluidic check-valve in FIG. 6.
Figure 7B:
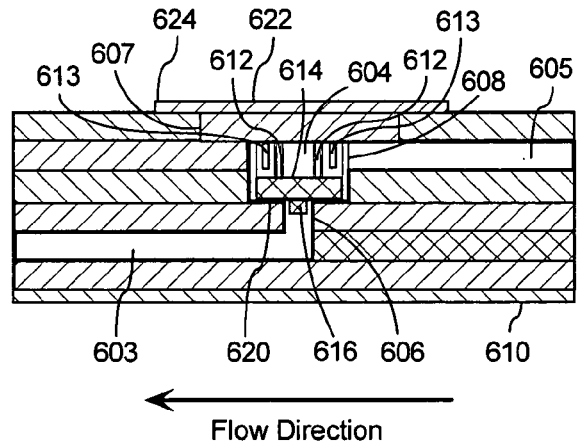
Figure 8:
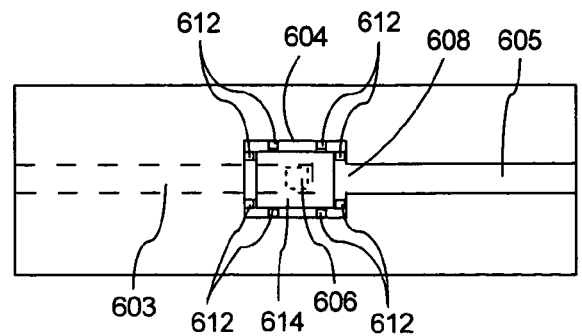
FIG. 8 is a cross-sectional view of the micro-fluidic check-valve in FIG. 6, taken along line 8-8.

FIGS. 6-8 show an alternative arrangement of a check-valve assembly 600 integrated in an LTCC substrate 602. As with the embodiment in FIGS. 1-5, the check-valve assembly 600 can be comprised of a plurality of LTCC layers 601-1, 601-2, 601-3, 601-4, 601-5, 601-6 and an optional conductive ground plane layer 610. More or fewer LTCC layers can be used and the invention is not limited to any particular number of layers. The LTCC layers can be fired together using conventional LTCC firing processes to form the check-valve assembly 600 as shown. An access port 607 can be formed in the check-valve assembly as shown.

The LTCC layers 601-1, 601-2, 601-3, 601-4, 601-5, 601-6 can define a check-valve chamber 604 that has at least one inlet port 606 and at least one outlet port 608. Input and output fluid conduits 603, 605 can be provided for fluid communication with the input and output ports respectively. A plug 614 can be inserted through the access port 607 and positioned as shown within the check-valve chamber 604 after the LTCC tape layers have been fired. The plug 614 is preferably formed so that it will be at least somewhat larger than the size of the opening defining the inlet port 606.

The plug 614 can advantageously be formed so as to have any shape that will allow the plug to form a close fitting seal when it is urged against the inlet port 606. For example, a spherical or a parallelepiped shape can be used for this purpose. The spherical shape (not shown) will allow the plug 614, when it is urged toward the inlet port 606, to block the inlet port 606 regardless of the orientation of the plug. The parallelepiped shape, if used to form the plug, can have a nub 616 as shown. The nub 616 can help center the plug in the inlet port and provide a better seal. Still, those skilled in the art will readily appreciate that the plug 616 can have other shapes and still form a suitable seal.

The plug 614 can be formed of any suitable material that is compatible with the LTCC layers, and any fluid that is intended to be used in the device. For example, the plug 614 can be formed of a metal, glass or polymer. Alternatively, it may be desirable to form the plug from LTCC which has been fired before being positioned in the check-valve chamber. The plug 614 can be shaped while the LTCC from which it is formed is still in the unfired state. The plug can then be fired prior to being positioned within the check-valve chamber. Alternatively, the plug can be fired and then machined to the proper shape before being placed within the check valve chamber.

After the plug 614 is positioned within the check-valve chamber, cap 622 can be positioned in the check-valve access port 607 to close the chamber. The cap can include a flange 624 that extends somewhat beyond the edge of the opening defined by the access port 607. The flange 624 can help provide a better seal in some instances and can provide a surface on which an adhesive can be disposed for securing the cap to the outer surface of the LTCC layers. However, the invention is not limited in this regard and the cap 622 does not need to include such a flange.

The cap 622 can be secured in the access port 607 by any suitable means. For example, an epoxy adhesive can be disposed around a periphery of the cap 622 to secure it to the LTCC layers and ensure a fluid seal. Alternatively, any other adhesive can be used provided that it is compatible with LTCC and will not be otherwise adversely affected by any fluid that may eventually be used in the check-valve. Adhesive can be disposed in those areas where the cap 622 has surfaces in contact with the access port 607 and around a periphery of the access port. Alternatively, the cap 622 can be sintered, threaded into the access port or secured by a pressure fit. Still, the invention is not limited in this regard and any other suitable securing method can also be used.

The inlet port 606 can also include a valve seat 620. The valve seat can define a contour or surface corresponding to at least a portion of the shape of the plug 614 for forming a good seal with the plug 614. In FIGS. 7A and 7B, the plug 614 has a planar contour for engaging the valve seat 620. However, the invention is not limited in this regard and other contours are also possible.

A guide structure 612 can optionally be provided within the check-valve chamber 604 to constrain the motion of the plug 614. The guide structure 612 can perform several functions. For example, in FIGS. 6-8, where a non-spherical shaped plug is used, the guide structure 612 can maintain the plug 614 in a desired orientation for forming a seal with the inlet port 606. The guide structure can also be used to limit a range of motion for the plug 614 so as to ensure that the plug cannot seal the outlet port 608 when fluid is flowing in a forward direction, i.e. from the inlet port toward to outlet port.

In FIG. 7A-7B and FIG. 8, the guide structure 612 is formed as a series of ridges defined along the inner surface of the check-valve chamber 604. The ridges hold the plug in position while ensuring that a flow of fluid can occur between the walls of the check-valve chamber and the outer periphery of the plug. Still, those skilled in the art will readily appreciate that the invention is not limited in this regard. Instead, any suitable structure can be defined within the check-valve chamber to limit the range of motion of the plug 614, provided that suitable accommodation is made to permit fluid flow in a forward flow direction as shown in FIG. 7A.

Referring again to FIG. 7A, it may be observed that fluid flow in a forward direction can cause the plug 614 to disengage from the valve seat 620. The guide structure 612 will ensure that the plug 614 can be guided so as to remain clear of the outlet port 608. Still, fluid will be able to flow freely in the forward direction since the ridges formed by the guide structure define fluid channels around the outer periphery of the plug 614.

Further, in order to facilitate operation of the check-valve in an inverted orientation, it can be advantageous to include spacers 613 disposed between the plug 614 and cap 622. The spacers 613 can be formed as part of the cap 622 or as part of the plug 614. The spacers 613 can be formed using conventional techniques most appropriate to the material from which the cap or plug has been formed. The spacers can allow for fluid pressure to form above the plug when backpressure is applied.

The check-valve 600 can prevent a fluid backflow. In the event that conditions in a fluid system in which the check-valve is installed cause a fluid flow in the direction shown in FIG. 7B, the plug 614 will be urged toward the inlet port 606 and will ultimately become lodged in the valve seat 620.

Thereafter, backflow of fluid will be prevented and the plug 614 will not become unseated until a fluid flow in the direction shown in FIG. 7A is resumed. Notably, if the check-valve arrangement in FIG. 7A-7B and FIG. 8 is oriented as shown, gravitational force will urge the plug 614 toward the inlet port 606 provided that fluid is not flowing in the direction in FIG. 7A. Accordingly, the check-valve will remain in a normally closed position when fluid is not flowing in a forward direction. This can be an advantage in certain applications.

Figure 9:
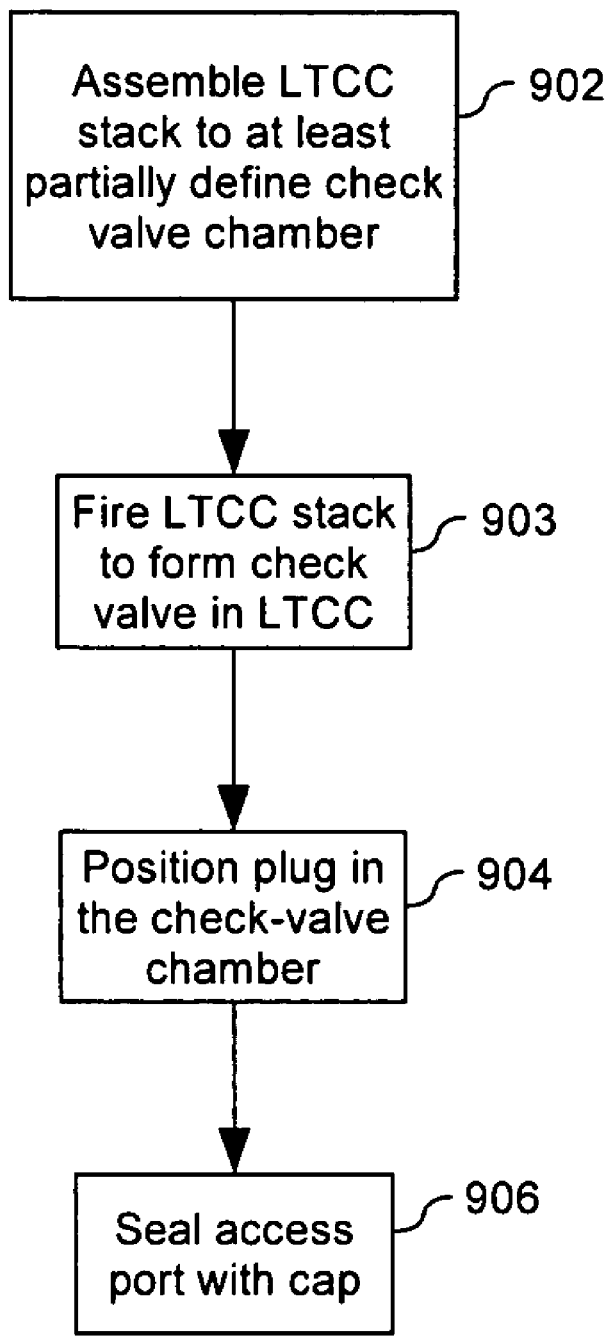
FIG. 9 is a flow chart that is useful for understanding a process for embedding a check-valve in a micro-fluidic system.

Referring now to FIG. 9, a process for manufacturing a check-valve assembly as described in FIGS. 1-8 shall now be described in greater detail. The process can begin in step 902 by forming an LTCC stack using conventional LTCC processing techniques. The stack can be comprised of a plurality of layers of Green Tape®, or any other similar type LTCC material, so as to at least partially define a check valve chamber 104, 604 as described herein. The exact shape, size and location of the check-valve chamber is not limited to a structure of any particular size, shape or location, provided that a plug positioned therein will block a flow of fluid in a backflow direction. In step 902, the LTCC layers can also be formed so as to define the access port 103, 607.

In step 903, the LTCC stack can be fired in accordance with a conventional LTCC firing profile. Thereafter, in step 904, a plug 114, 614 can be disposed in the check-valve chamber as previously described. If an LTCC plug is used, the plug is fired before being positioned within the chamber. In step 906, the access port 103, 607 can be sealed using a cap 120, 622.

One advantage of the foregoing process is that it allows the check-valve assembly to be integrally formed with the remainder of the fluidic system during the firing process. The resulting system is compact, economical to manufacture, and offers the potential for good reliability. Pre-firing the check-valve chamber prior to insertion of the plug ensures that the plug will not be damaged during any subsequent firing process. Further, if the plug is formed of LTCC, the pre-firing of the check-valve chamber and the plug ensures that the plug will not adhere to the walls of the check valve-chamber during the firing process.

As noted above, the LTCC stack can be fired in the conventional manner. LTCC initial firing temperature is typically up to about 500° C. to about 1100° C. depending on the particular design and LTCC material composition. The remaining processing steps for completing the part, including the placement and firing of one or more ceramic layers, and the addition of any electronic circuit component(s) to the surface of the device, can be performed in accordance with conventional LTCC fabrication techniques.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. A method for embedding a check-valve in an LTCC based micro-fluidic system, comprising the steps of:

forming from at least one layer of an unfired low-temperature co-fired ceramic (LTCC) tape, a check-valve chamber, an inlet port in fluid communication with said check-valve chamber, and at least one outlet port in fluid communication with said check-valve chamber;

firing said at least one layer of LTCC tape;

positioning within said check-valve chamber a plug having a size and shape selected for sealing said inlet port when said plug is lodged in a valve seat of said inlet port; and sealing said check-valve chamber with a cap after said plug is positioned within said check-valve chamber.

2. The method according to claim 1, further comprising the step of selecting a shape of said check-valve chamber and a position of said inlet port for automatically sealing said inlet port with said plug in the presence of a fluid backflow from said check-valve chamber toward said inlet port.

3. The method according to claim 2, further comprising the step of selecting said shape of said check-valve chamber for automatically unsealing said plug from said inlet port in the presence of a fluid flow from said inlet port toward said check-valve chamber.

4. The method according to claim 1, further comprising the step of forming said check-valve chamber to have a tapered profile.

5. The method according to claim 4, further comprising the step of forming said tapered profile to taper inwardly in a direction toward said inlet port.

6. The method according to claim 1, further comprising the step of forming said check-valve chamber with a plurality of said outlet ports.

7. The method according to claim 1, further comprising the step of selecting said plug to have a spherical shape.

8. The method according to claim 1, further comprising the step of forming a valve seat for said inlet port, said valve seat defining a sealing surface corresponding to at least a portion of said plug.

9. The method according to claim 1, further comprising the step of forming said check-valve chamber exclusive of any structure to restrict the movement of the plug within the check-valve chamber.

10. The method according to claim 1, further comprising the step of constraining a range of movement of said plug to prevent sealing of at least one said outlet port.

11. The method according to claim 10, wherein said constraining step is further comprised of forming a guide structure in at least one of said LTCC tape and said cap for guiding said plug within said check-valve chamber.

12. The method according to claim 1 further comprising the step of selecting a plug formed from at least one of a metal, a polymer, and an LTCC material.

13. The method according to claim 1 further comprising the step of forming said inlet port and said outlet port on mutually orthogonal surfaces of said check-valve chamber.

14. An embedded fluid check-valve integrated within an LTCC substrate, comprising:

a check-valve chamber formed from at least one layer of an unfired low-temperature co-fired ceramic (LTCC) tape, said check-valve chamber having an inlet port in fluid communication with said check-valve chamber, and an outlet port in fluid communication with said check-valve chamber;

a plug positioned within said check-valve chamber, at least a portion of said plug having a shape corresponding to a contour of a valve seat formed at an interface between said inlet port and said check-valve chamber;

a cap enclosing at least a portion of said check-valve chamber and an attachment means securing said cap to at least said portion of said check-valve chamber;

wherein said attachment means is a member of the group consisting of a solder and an adhesive.

15. The embedded check-valve according to claim 14, wherein said check-valve chamber comprises a plurality of said outlet ports.

16. The embedded check-valve according to claim 14, wherein said plug has a spherical shape.

17. The embedded check-valve according to claim 14, wherein said plug is formed from a material selected from the group consisting of a polymer, a metal and an LTCC.

18. The embedded check-valve according to claim 14, wherein said check-valve chamber provides an unrestricted range of movement for said plug within the check-valve chamber.

19. The embedded check-valve according to claim 14, wherein said check-valve chamber further comprises at least one guide surface constraining the movement of said plug within said check-valve chamber.

20. The embedded check-valve according to claim 14 wherein said inlet port and said outlet port are disposed on mutually orthogonal surfaces of said check-valve chamber.

21. The embedded check-valve according to claim 14, wherein said adhesive is an epoxy.

* * * * *